United States Patent [19]

O'Connor

[11] 4,246,931
[45] Jan. 27, 1981

[54] FUEL SAFETY VALVE AND REGULATOR

[75] Inventor: Alton J. O'Connor, Cass City, Mich.

[73] Assignee: Walbro Corporation, Cass City, Mich.

[21] Appl. No.: 99,474

[22] Filed: Dec. 3, 1979

[51] Int. Cl.³ .............................................. F16K 31/12
[52] U.S. Cl. ................................ 137/494; 137/505.41
[58] Field of Search .............. 137/495, 505.41, 505.43

[56] References Cited

U.S. PATENT DOCUMENTS

| 193,548 | 7/1877 | Plass et al. ........................ 137/505.41 |
| 549,407 | 11/1895 | Vail ................................ 137/505.41 X |
| 1,946,188 | 2/1934 | Birch ................................ 137/505.41 |
| 2,147,850 | 2/1939 | MacLean ........................ 137/505.41 X |
| 2,499,527 | 3/1950 | Raymond ........................ 137/494 |
| 3,782,858 | 1/1974 | Deters ............................ 137/505.41 X |

*Primary Examiner*—Harold W. Weakley
*Attorney, Agent, or Firm*—Barnes, Kisselle, Raisch & Choate

[57] ABSTRACT

A fluid control valve actuated by a biased diaphragm responsive to fluctuating pressure in the flow area of the valve to control the valve under conditions of high pressure or reduced pressure. A secondary safety diaphragm is provided separated from the controlled fluid, usually a hydrocarbon, to insure that a breach of a primary diaphragm will not permit leakage to atmosphere.

3 Claims, 4 Drawing Figures

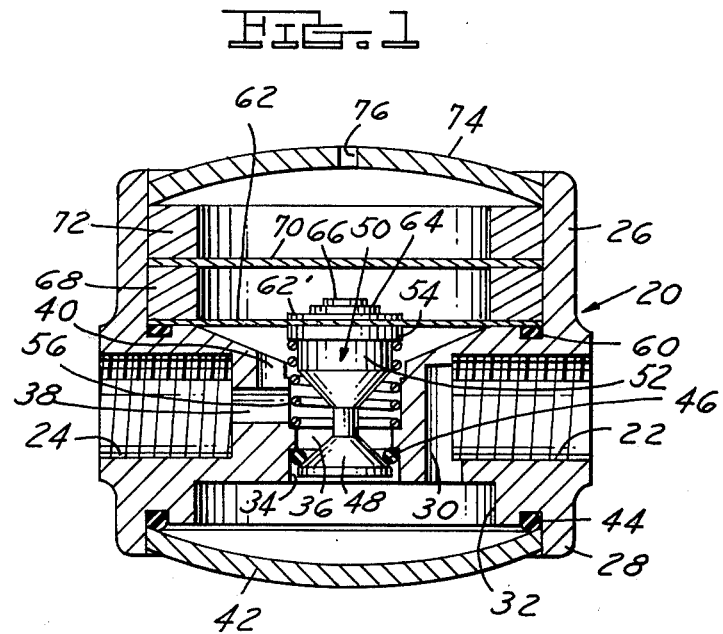
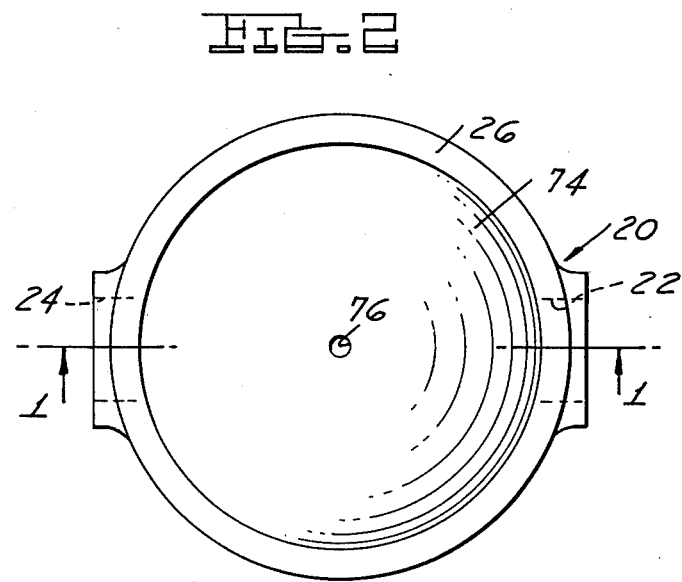

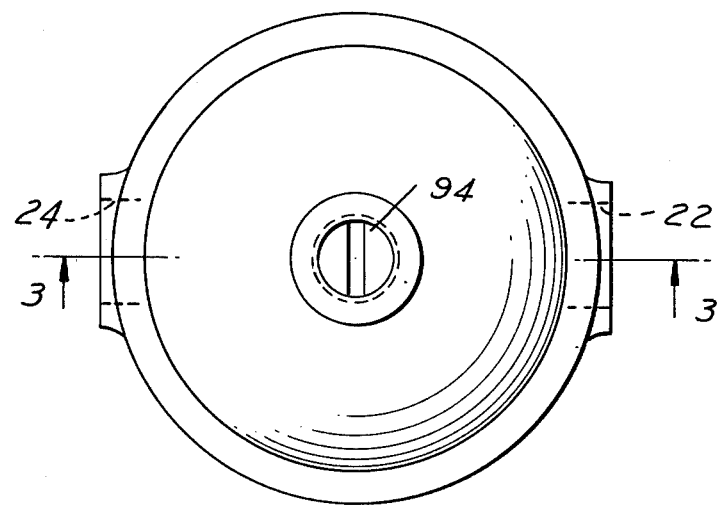
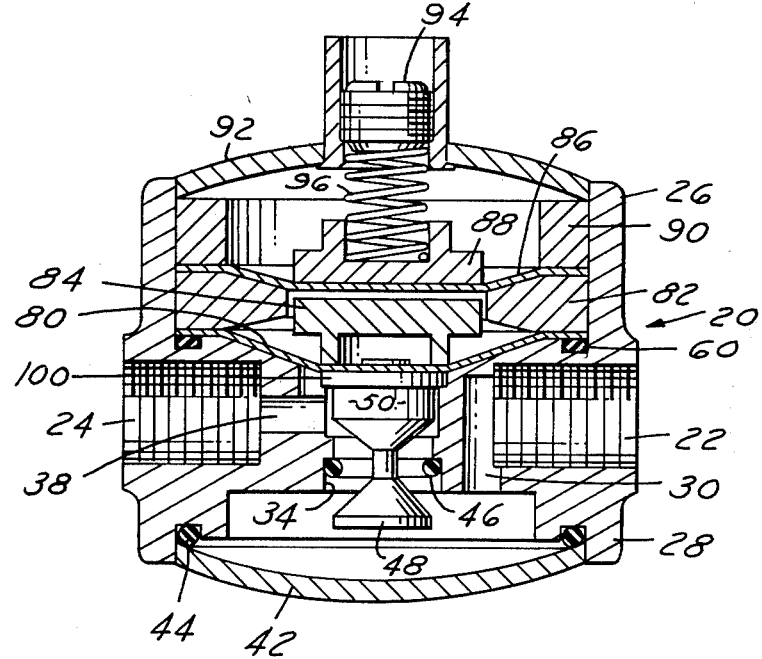

FUEL SAFETY VALVE AND REGULATOR

FIELD OF INVENTION

Resiliently biased, diaphragm operated, valves for controlling the flow of explosive hydrocarbons with safety diaphragm structure.

BACKGROUND OF INVENTION

In fuel systems, valves, characterized as "demand" valves, maintain fuel supply lines closed except when a utility such as a furnace is using fuel and a reduced pressure in the supply line on the utility side causes a diaphragm controlling the valve to open the valve. Similarly, pressure regulator valves which are diaphragm controlled, rather than using a solid piston, will be controlling the flow of inflammable fluid which will be in contact with the flexible diaphragm.

These control diaphragms are made from a material that is resistant to hydrocarbons and yet the constant flexing might cause a breach which could result in a leak of the hydrocarbon to the surrounding environment. Diaphragms need atmospheric venting on one side and thus cannot be totally sealed off.

The present invention has an object, the provision of a diaphragm-controlled valve which has a safety design to avoid leakage of the fluid being controlled. It is a further object to provide a safety valve for inflammable fluids which is relatively inexpensive to manufacture.

Other objects and features of the invention will be apparent in the following description and claims in which the principles of the invention are set out together with details to enable persons skilled to make and use the invention.

BRIEF DESCRIPTION OF THE DRAWINGS

Drawings accompany the disclosure and the various views thereof may be briefly described as:

FIG. 1, a sectional view of a diaphragm controlled demand valve taken on line 1—1 of FIG. 2.

FIG. 2, a top view of the valve of FIG. 1.

FIG. 3, a sectional view of valve regulator construction incorporating the principles of the invention taken on line 3—3 of FIG. 4.

FIG. 4, a top view of the valve illustrated in FIG. 3.

DETAILED DESCRIPTION OF THE INVENTION AND THE MANNER AND PROCESS OF MAKING AND USING

With reference to the drawings, in FIGS. 1 and 2, a main valve housing 20 has a threaded inlet port 22 on one side and a threaded outlet port 24 on the other side. An upstanding flange 26 on the top of the housing, as illustrated, provides an upper chamber, and a depending flange 28 forms circumferential walls for a lower chamber. A bore 30 connects to a flat recess 32 which opens to a central bore 34 having an inwardly extending annular rib 36 which provides shoulders on either side.

A cross passage 38 connects the port 24 to the central bore 34 and an axial passage 40 provides communication between passage 38 to a chamber within the circumferential flange 26.

The bottom recess 32 and the area within the depending flange 28 is closed by an expansion plug 42 sealed by an O-ring 44 recessed in an annular groove. An O-ring 46 seats against the shoulder formed below rib 36 to form a valve seat for a conical portion 48 of a valve 50 in the form of a spool with a bottom flange 48 and a top portion 52 connected by a narrow stem. To permit assembly, the bottom flange 48 will pass through the opening formed by the rib 36 and the O-ring 46 has an inner diameter which permits it to form a valve seat.

The top portion 52 of the valve 50 has an upper flange 54 which forms a seat for a spring 56 seating at its bottom end on the top shoulder of rib 36, thus biasing the valve to a closed position.

At the top of the housing within the flange 26 is a recessed O-ring 60 over which lies the circumference of a primary diaphragm secured to the top of the valve 50 by a gasket 62, a cup washer 64, and a headed screw 66. A spacer 68 overlies the periphery of primary diaphragm 62 and a secondary diaphragm 70 is clamped at its periphery by a second spacer 72 held in place by an expansion plug 74. An atmospheric port 76 is provided in plug 74.

The spring 56 normally holds the valve 50 in a closed position as shown in FIG. 1. If, for example, the inlet port 22 is connected to a fuel oil supply tank and the outlet is connected to a furnace, when the furnace is turned on, the fuel pump of the furnace will create a subatmospheric pressure in port 24. This pressure will act on primary diaphragm 62 causing it to move downward against the spring 56. This movement will move valve flange 48 away from O-ring 46 to permit fuel to flow to the furnace from a tank supply. When the furnace shuts off, the spring 56 will close the valve and cut off the fuel supply.

Secondary diaphragm 70 will fluctuate somewhat with the primary diaphragm but is not subject to the mechanical stress or the exposure to hydrocarbon. Thus, it has a projected life expectancy much greater than that of the primary diaphragm. It serves also to seal the valve housing against any leakage of the fuel should there be a breakdown of the primary diaphragm.

In FIGS. 3 and 4, a modified valve construction is shown utilizing the same valve housing as described in connection with FIGS. 1 and 2. Like parts are designated by like reference characters. A primary diaphragm 80 is clamped at its periphery against O-ring 60 by an annular spacer 82 which has chamfered portions at the inner diameter. The valve 50 is affixed centrally to the lower diaphragm 80 and a spacer 84 is carried by the valve and diaphragm. A secondary upper diaphragm 86 carrying centrally a spacer and spring seat 88 is peripherally locked by an annular spacer 90 held in place by an expansion plug plate 92 carrying a central tube threaded internally to receive a threaded adjustment plug 94. A coil compression spring 96 seats in spacer 88 and against the plug 94.

The valve 50 is normally open by reason of the weight of the valve and the spacer 88 on diaphragm 80 and the action of spring 96 on diaphragm 86. As a pressure regulator when pressure in port 24 builds up to a predetermined setting, this will exert an upward force on diaphragm 80 and cause it to lift against spring 96 to close the valve portion 48 against O-ring 46. This closes off the pressure from the inlet 22. When pressure at outlet 24 decreases to below the desired setting, the valve will open. Accordingly, an equilibrium will be established which will maintain a desired pressure in the valve outlet.

Since the diaphragm 86 is imperforate, it will serve as a safety barrier in the event of any breach in the primary diaphragm. As viewed in FIG. 3, the valve 50 has an upper flange 100 which seats in a groove at the top of the central bore 34 to limit the downward movement of the valve 50 and the lower diaphragm 80.

I claim:

1. A diaphragm-operated valve for controlling fluid flow which comprises:
    (a) a housing having a central axis and having a fluid inlet and a fluid outlet radial to said axis connected by an axial passage having a valve seat,
    (b) said housing having an upstanding flange at one end and a depending flange at the other end forming flat recesses on the axis of the housing,
    (c) means closing the depending flange to form a chamber in communication with said inlet and said valve seat,
    (d) a plurality of spaced diaphragms lying across said recess within said upstanding flange in planes perpendicular to said central axis to form separate chambers within said upstanding flange,
    (e) spacers between said diaphragms sealing the peripheries thereof,
    (f) a closure for said upstanding flange above said recesses, and
    (g) a control valve suspended from the lower of said diaphragms having a portion to cooperate with said valve seat to open and close said seat in response to pressures acting on said lower diaphragm.

2. A diaphragm-operated valve for controlling fluid flow as defined in claim 1 in which an annular rib adjacent said valve seat forms spaced shoulders, an O-ring lying against one of said shoulders to form a valve seat seal, and a spring seated at one end against the other of said shoulders and bearing at the other end against said lower diaphragm to urge said valve to a closed position.

3. A diaphragm-operated valve for controlling fluid flow as defined in claim 1 in which a spacer is interposed between said diaphragms, an adjustable spring seat in said closure for said upstanding flange, and a compression coil spring interposed between the upper of said diaphragms and said spring seat to bias said diaphragms and said valve to an open position, and means on said valve and said housing to limit the opening movement of said valve.

* * * * *